United States Patent [19]

Neidigk

[11] Patent Number: 4,706,343
[45] Date of Patent: Nov. 17, 1987

[54] HYDRAULIC LOAD BINDER

[76] Inventor: Steven F. Neidigk, 1121 John Regan, Fort Worth, Tex. 76126

[21] Appl. No.: 810,739

[22] Filed: Dec. 19, 1985

[51] Int. Cl.$^4$ .............................................. A43C 11/00
[52] U.S. Cl. ................................ 24/68 R; 24/68 CD; 410/103; 410/100; 254/93 H; 254/228
[58] Field of Search ............ 24/68 R, 68 CT, 68 CD; 410/103, 100, 36; 254/93 R, 93 H, 228, 93 A

[56] References Cited

U.S. PATENT DOCUMENTS

| | | | |
|---|---|---|---|
| 1,435,128 | 11/1922 | Newman | 254/93 H |
| 1,455,224 | 5/1923 | Paoli | 254/93 H |
| 1,497,218 | 6/1924 | McBride | 254/93 H |
| 1,812,577 | 6/1931 | Albertine | 254/93 H X |
| 1,903,887 | 4/1933 | Widener | 254/93 H X |
| 1,920,285 | 8/1933 | Wilkins et al. | 254/93 H X |
| 1,964,003 | 6/1934 | McBride | 254/93 H X |
| 2,010,679 | 8/1935 | Rosenberry et al. | 254/93 H X |
| 2,249,078 | 7/1941 | Fox . | |
| 2,383,061 | 8/1945 | Johnson . | |
| 2,620,160 | 12/1952 | Ray . | |
| 2,773,700 | 12/1956 | Lasswell . | |
| 2,907,600 | 10/1959 | Lowery . | |
| 3,150,859 | 9/1964 | Payne . | |
| 3,298,663 | 1/1967 | Hextell . | |
| 3,395,932 | 8/1968 | Meyers . | |
| 3,662,994 | 5/1972 | Johns . | |
| 3,891,187 | 6/1975 | Bearden, Jr. . | |
| 3,998,167 | 12/1976 | Van Gompel . | |
| 4,004,777 | 1/1977 | Despas . | |
| 4,036,476 | 7/1977 | Douce et al. . | |
| 4,223,869 | 9/1980 | Patterson, III et al. | 24/68 CD |
| 4,540,159 | 9/1985 | Jordan | 254/228 |

FOREIGN PATENT DOCUMENTS

| | | | |
|---|---|---|---|
| 556560 | 7/1923 | France | 254/93 |
| 7713057 | 6/1979 | Sweden . | |
| 968180 | 10/1982 | U.S.S.R. | 254/228 |

Primary Examiner—Peter A. Aschenbrenner
Assistant Examiner—Laurie K. Cranmer
Attorney, Agent, or Firm—Vaden, Eickenroht, Thompson & Boulware

[57] ABSTRACT

An hydraulic load binder is disclosed for universal application, the piston rod assembly, the reservoir assembly and the pump assembly all being commonly housed. The channels to and from the pump and the piston rod chamber and the reservoir chamber are controlled by simple check valves. Two additional channels are provided for communicating the top of the piston rod chamber with the reservoir chamber. One of these additional channels includes a check valve which opens when the pressure in the piston rod chamber reaches a predetermined limit. The other additional channel is controlled by a needle valve, which is opened once a rotatable mechanical locking means is placed in locking position against the extended piston rod. Opening the needle valve depressurizes the piston rod chamber. The piston rod chamber is again pressurized to permit the mechanical lock to be released.

14 Claims, 7 Drawing Figures

FIG. 2
FIG. 3
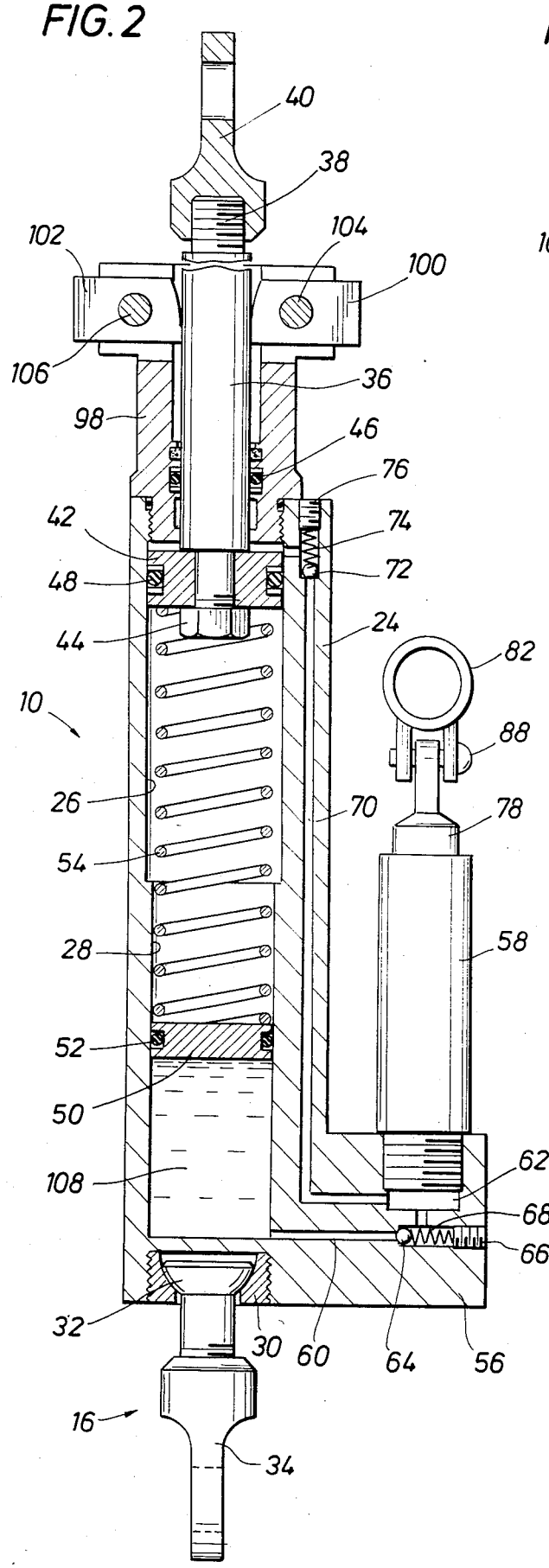
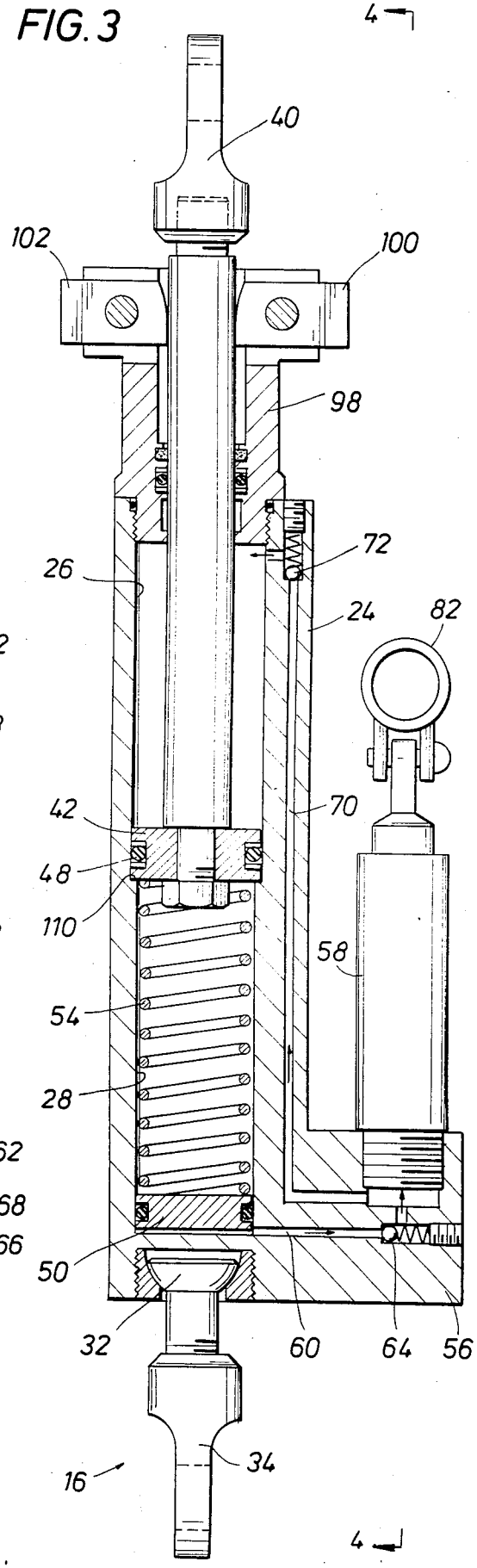

FIG.6
FIG.7
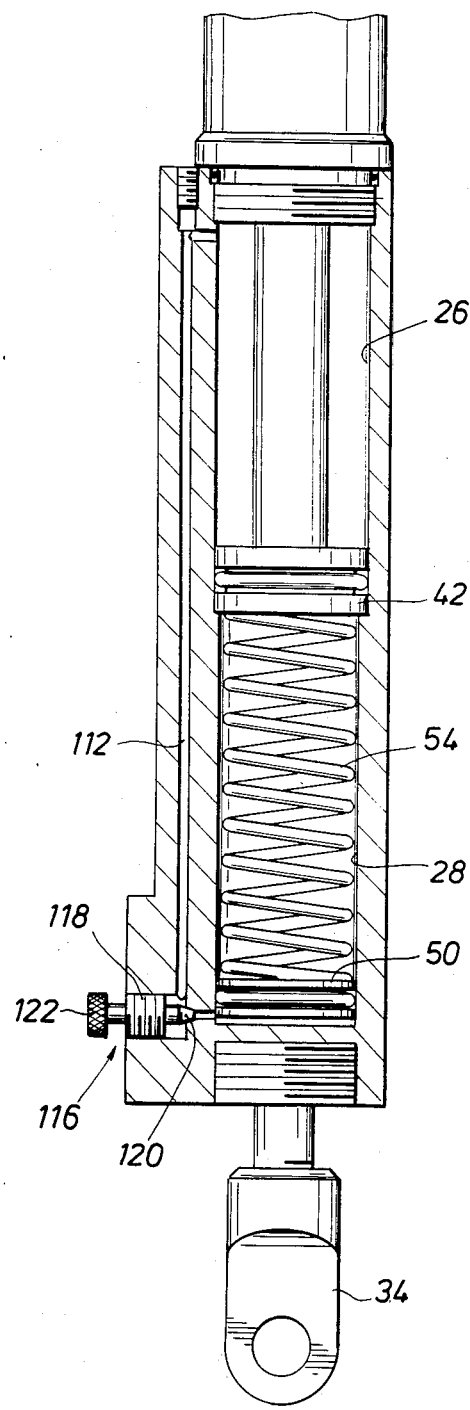
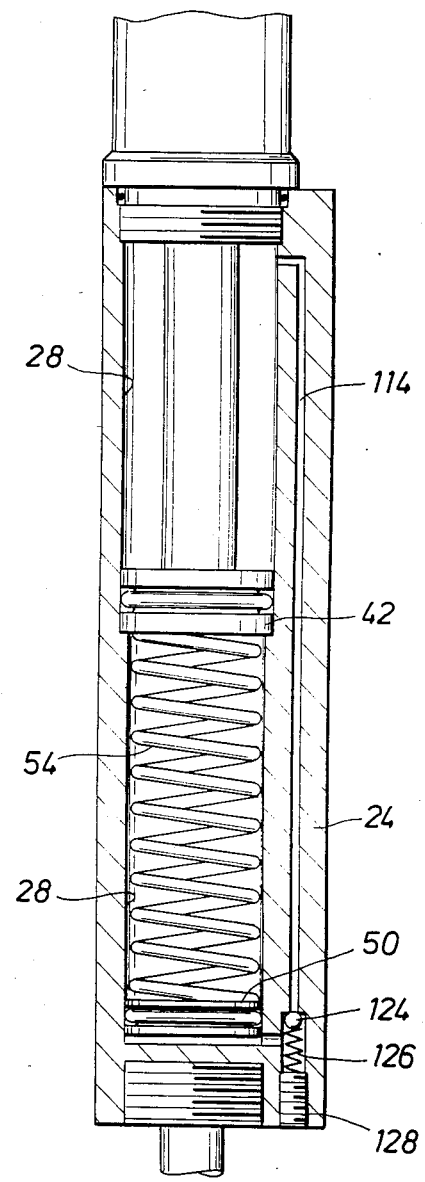

HYDRAULIC LOAD BINDER

BACKGROUND OF THE INVENTION

1. Field of the Invention

This invention pertains to devices for holding and constraining heavy loads in place and more particularly to tying down cargo on flat bed trucks or the like.

2. Description of the Prior Art

Cargo that is carried on large flat bed trucks are secured in place or held down by straps, chains, rope and the like and then locked in place by devices known as "load binders". The loads are often very heavy loads such as stacks of lumber, heavy equipment and the like. If the load is not held securely in place, the load will shift or even fall from the truck. Obviously, when a large load slides off a truck bed, the results can be and often are disastrous. Not only is the load damaged or destroyed, time delays occur as the load is reloaded, but accidents and even deaths have resulted from loads being lost.

The most common type of load binder employed is a mechanical binder having a mechanical clamp mechanism and secured in holding or locking condition by a large handle that operates as a lever to give the operator the necessary mechanical advantage to close the load binding connection. The handle is part of the mechanism itself and stays in position when the connection or lock is completed.

Loads are tied down under quite a bit of tension to ensure that loads cannot shift or that parts of the load, such as a board of lumber, cannot work free from the overall load. Hence, when the load binder is released, care must be exercised to prevent the handle from flying loose too fast and causing injury to the operator or others nearby. In fact, the initial tension applied to the load at the time of tie-down may well be increased by the time the load binder is released. This is because the load could have shifted slightly during transport to put more pressure against the strap, rope, chain, etc. than when the load was originally tied down. In summary, such prior art devices have long been in use but take their toll in injuries every year. They are considered to be very hazardous devices by the operators.

Attempts have been made in the prior art to avoid the traditional type of device just described by employing hydraulic or pneumatic arrangements. Such efforts are exemplified by the device shown in U.S. Pat. No. 2,773,700, Lasswell, issued Dec. 11, 1956. The Lasswell device includes an hydraulic cylinder permanently bolted to the underside of the truck bed. The system requires an hydraulic pump, four-way valving, a pressure switch, a solenoid and a requirement for electrical current to three different mechanisms of this device. In short, the Lasswell is no simple substitute for the traditional load binder. Similar devices are shown in U.S. Pat. No. 3,395,932, Meyers, issued Aug. 6, 1968 and Swiss Pat. No. 7,713,057, Laxo Mekan AB, issued June 1979.

U.S. Pat. No. 3,998,167, Van Gompel, issued Dec. 21, 1976, shows a device that has to be cut free to be released. As noted in the above description, load tie-down puts the tying down parts under a great deal of tension. Cutting the rope or cable to cause release would appear to be a dangerous practice. Moreover, the device could not be used practically with chains, the most common tie-down medium of all.

U.S. Pat. No. 2,249,078, Fox, issued July 15, 1941, shows a rather cumbersome clevis and trunion mechanism operating with an extending rod and which can only be operated in the upright position. It is doubtful that such a device could be used reliably in the rugged conditions that exist for load binders.

U.S. Pat. No. 4,004,777, Despas, issued Jan. 25, 1977, shows an hydraulic tensioning device. The number of parts are exceedingly large and complex. A practical hydraulic device for a load binder application (the Despas device is for tensioning a line on a sailboat) must be simple and rugged and reliable. No constant surveillance of the device is possible in such an application.

U.S. Pat. No. 2,620,160, Ray, issued Oct. 6, 1959, shows a device for hoisting hooks and is not operable except in the vertical position. It does not have a separate mechanical lock and has to use an auxiliary or separate non-self-contained pump.

U.S. Pat. No. 2,907,600, Lowrey, issued Dec. 2, 1952, is of similar design to Ray.

U.S. Pat. No. 3,150,859, Payne, issued Sept. 29, 1964 shows a device that uses a pump which is not a part of the device. It has no mechanical locking part and is designed for the purpose of working on the tracks of a track vehicle. It is generally unsuitable for a load binding application.

U.S. Pat. No. 3,298,663, Hextell, issued Jan. 17, 1967, shows yet another device in which the pump is not integral, a basic requirement for a universal hydraulic load binder. The device does not use a mechanical lock, it uses a 4-way valve. The dog-leg mechanism in Hextell would not appear to be appropriate for a load binder.

U.S. Pat. No. 3,662,994, Jones, issued May 16, 1972, shows an apparatus to push apart or pull two rigid members together. It is not equipped to tighten chain. The device uses an external source for fluid. It has no mechanical locking device and it uses Z-shaped jaws, which are unsuitable on a load binder.

U.S. Pat. No. 2,383,061, Johnson, issued Aug. 21, 1945, uses a pump external to the device and is generally a jack attachment, not a device for applying tension. There is no mechanical locking device provided.

U.S. Pat. No. 4,036,476, Douce et al, issued July 19, 1977, is a different type of mechanism altogether from applicant's device in that it employs a winch permanently located at a fixed location on a truck bed. The device requires a source for fluid or for drawing a vacuum.

U.S. Pat. No. 3,891,187, Bearden, Jr., issued June 24, 1975, shows a device employing a double-acting cylinder and dependent on an external power source. The device employs a 4-way valve and has no mechanical locking device.

Hence, in summary of the known prior art, hydraulic devices have been employed for a myriad of applications, but few attempts have been made to make them suitable for a load binding application. The one or two attempts that have been made to make an hydraulic load binder have been mechanisms that are not self-contained, but which use complicated valving, external fluid sources, external power sources, are permanently affixed to the truck bed and are generally unsuited as a safe and easy-to-use self-contained substitute for the conventional and traditional universal load binder described initially.

Therefore, it is a feature of the present invention to provide an improved hydraulic load binder of simple and self-contained design that can be employed in a universal application.

It is another feature of the present invention to provide an improved hydraulic load binder that is readily operated by an operator at any attitude and which does not employ a permanently attached handle that is only operable under tension potentially hazardous to the operator.

SUMMARY OF THE INVENTION

The self-contained load binding apparatus in accordance with the present invention includes a housing enclosing a main cylinder chamber and a piston rod that retracts into this chamber to draw into tension the tie-down chains or the like that are externally connected to the housing and the piston rod. The main housing also includes a reservoir chamber in-line with the piston rod chamber. A pump chamber is located alongside the main cylinder chamber and is connected through suitable channel ports to the bottom of the reservoir chamber and to the top of the piston rod chamber for transferring fluid from the reservoir via the pump cylinder past suitable simple check valves in the channel ports. An over-pressure channel from the piston rod chamber to the reservoir chamber with a suitable check valve provides assurance against over-pressurizing the piston rod chamber.

Another channel is provided from the piston rod chamber to the reservoir chamber closed off by a needle valve. When the piston rod is in the condition to suitably bind the load, appropriate mechanical locks which swivel about points of rotation are positioned against the extended rod. The piston rod chamber is then depressurized via the needle valve and the load binder is held in place by this mechanical means. When it is desired to unlock the load binder, the piston rod chamber is pressurized, as before, to allow the mechanical lock to be released.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a preferred embodiment of the invention and are therefore not to be considered limiting of its scope as the invention may admit to other equally effective embodiments.

IN THE DRAWINGS

Figure 1:
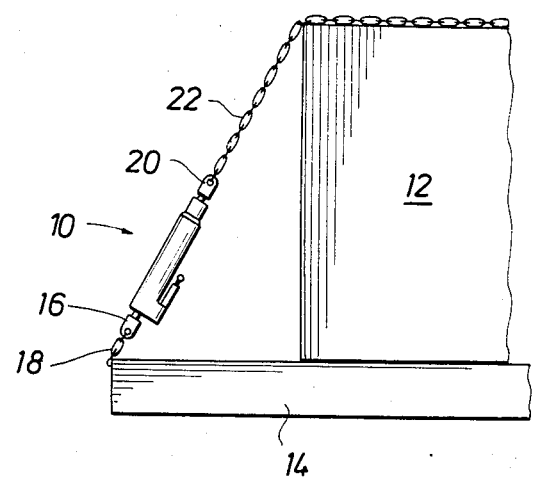

FIG. 1 is a side view of a preferred embodiment of a load binding apparatus in accordance with the present invention employed in holding down a load.

FIG. 2 is a vertical cross-sectional view of the load binding apparatus shown in FIG. 1 prior to the load being tightened.

FIG. 3 is a vertical cross-sectional view of the load binding apparatus shown in FIG. 1 following tightening of the apparatus with respect to its load.

Figure 4:
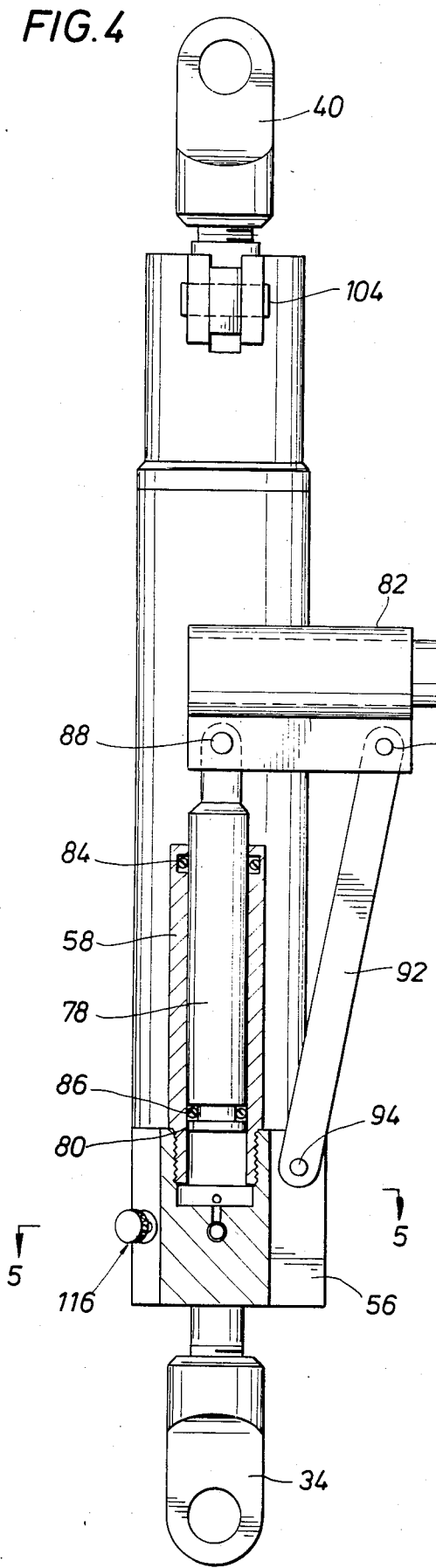

FIG. 4 is a vertical cross-sectional view of the load binding apparatus shown in FIG. 1 rotated 90°, to show the pump portion of the apparatus.

Figure 5:
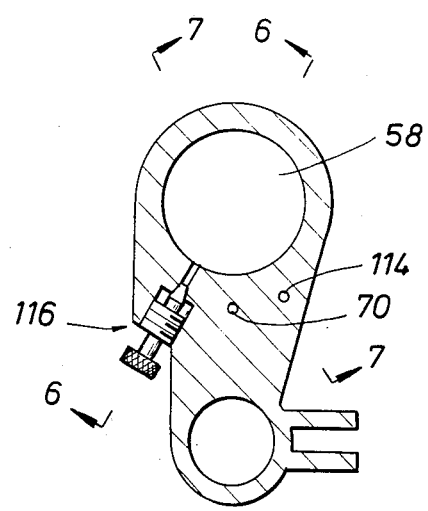

FIG. 5 is a cross-sectional view taken at line 5—5 of FIG. 4.

FIG. 6 is a cross-sectional view of the load binding apparatus shown in FIG. 1, particularly illustrating the manually operated valve and channel communicating the operating chamber and the reservoir chamber of the cylinder housing, and taken at line 6—6 of FIG. 5.

FIG. 7 is a cross-sectional view of the load binding apparatus shown in FIG. 1, particularly illustrating the relief valve and channel communicating the operating chamber and the reservoir chamber of the cylinder housing, and taken at line 7—7 of FIG. 5.

DESCRIPTION OF THE PREFERRED EMBODIMENTS

Now referring to the drawings and first to FIG. 1, a load binder 10 in accordance with the present invention is shown in service for holding down a load 12 on a truck bed 14. Such a use is illustrated as a typical use, although it will be seen that load binder 10 is a versatile apparatus having many applications. Moreover, the particular load being held down is not limited to a box type cargo. Any load held down by load binders in the prior art can be held down by the inventive hydraulic load binder described herein.

In any event, the lower end of load binder 10 includes a lower swivel connection 16 which includes a clevis grab hook and is attached to chain 18 connected to bed 14 and an upper connection 20 which also includes a clevis grab hook and is attached to chain 22, which is shown placed over load 12 and is connected to truck bed 14 on the other side of the load (not shown). As will be described fully below, load binder 10 is adjustable over a range of lengths so as to provide suitable tightening of chains 18 and 22 to hold load 12 in place while it is being transported. The load binder is loosened at the appropriate time so that the chains can be released and the load unloaded.

Now referring to FIG. 2, a vertical cross section of the embodiment of load binder 10 shown in FIG. 1 is illustrated. A housing 24 generally includes a main cylinder chamber 26 and an in-line reservoir chamber 28. Lower swivel connection 16 is connected into the lower end of the housing. The swivel connection is held in place by a holding nut 30 which screws into an internally threaded opening in the housing. Nut 30 includes an enlarged internal rounded cavity for matingly accommodating enlarged rounded end 32 of the connection. These rounded surfaces permit the connection to swivel. Nut 30 includes an opening smaller than its cavity through which an extension of swivel end 32 passes through to join ring connector 34. The external end of the extension end is screwed into ring connector 34. Ring connector 34 is the part which is connected to the clevis grab hook by means of a long bearing pin and attaches to chain 18, as described above.

Piston rod 36 retractably operates in main cylinder chamber 26 through a packing case, its external end 38 being threaded for connecting to ring connector 40. Ring connector 40 connects to the clevis grab hook as described above which attaches to chain 22, as shown in FIG. 1.

Elongate piston rod 36 is connected to piston head 42 in conventional manner by nut 44. Nut 44 is screwed through piston head 42 into the end of piston rod 36. Leakage of fluid from chamber 26 is prevented by O-rings 46 surrounding the extension end of the piston rod as it operates within the packing case. O-rings 48 seal the piston head with respect to the main cylinder chamber.

In-line reservoir chamber 28 is at a reduced diameter to chamber 26. Reservoir piston 50 operates within the reservoir chamber, the outer periphery of within the reservoir chamber, the outer periphery of which is sealed by O-rings 52 with respect to the reservoir chamber walls. Spring 54 is provided for resetting piston rod 36 in its upper position. Therefore, spring 54 operates between piston head 42 and reservoir piston 50.

Housing 24 is generally L-shaped and includes leg 56 to which the pump cylinder 58 is attached. Generally, pump cylinder 58 is tubular in shape and includes external threads for screwing into accommodating threads located in the top surface of leg 56 of the housing. A channel port 60 connects the lower end of reservoir chamber 28 with pump chamber 62 via a check valve 64. The pump chamber is located partly within cylinder 58 and partly within the housing where the cylinder and the housing join together. It may be seen that check ball valve 64 is inserted from the side wall of the housing through a suitable opening which is subsequently closed by bolt 66. A biasing spring 68 operating between bolts 66 and valve ball 64 maintains the valve ball in the closed position against channel 60 leading to reservoir chamber 28.

A channel 70 connects pump chamber 62 with main cylinder chamber 26 at a location near the top of the chamber and above piston head 42. A check valve ball 72 is held in a closed position by biasing spring 74 and bolt 76 in a similar fashion to the biasing arrangement of valve ball 64 described above.

Referring now to FIG. 4, pump cylinder 58 is shown in vertical cross section. Pump rod 78 operates within pump cylinder 58 and includes pump rod head 80 at its lower end and a connection to a generally cylindrical shaped pump handle 82. Pump rod 78 is sealed at its upper and lower locations by O-rings 84 and 86, respectively, with respect to the side wall of pump cylinder 58. The connection of pump rod 78 to pump handle 82 is via a pivot connection 88. The length of the pump handle 82 is relatively short; however, it is connected through another pivot connection 90 at its end opposite pivot connection 88. This connection is provided to angled leverage rod 92. Rod 92 is connected at one end to pivot connection 90 and at its other end to leg 56 of housing 24, through connection 94.

Pump handle 82 has a central opening for receiving an external rod 96 to allow the operator more leverage in operating the pump, as described below. Referring again to FIG. 2 and FIG. 4, a packing case 98 having a threaded lower end is screwed into accommodating threads in the upper end of the main cylinder chamber. Packing case 98 includes a central opening through which piston rod 36 operates, as described above. Mechanical wedge locking lugs 100 and 102 are connected on either side of piston rod 36 and secured by pivot connections within suitable slots within packing case 98. This pivot operation is provided by axles 104 and 106, respectively, for mechanical locks 100 and 102.

Operation of the apparatus just described can best be shown by reference to FIGS. 2 and 3. FIG. 2 illustrates the position of piston rod 36 prior to the load binder being placed in tension. It should be noted that piston rod 36 is at its uppermost position as determined by the full bias extension of spring 54 operating between piston head 42 and reservoir piston 50. Hydraulic fluid 108 is included in the reservoir chamber below reservoir piston 50. Operation of pump rod 78 draws hydraulic fluid through channel 60, past drawn open valve ball 64 into pump chamber 62. The downward stroke of pump rod 78 causes check valve 64 to again close and forces the hydraulic fluid drawn into pump chamber 62 to be forced through channel 70 past check valve 72 into main cylinder chamber 26 above piston head 42. As a result piston rod 36 is pushed down by hydraulic action or retracted into main cylinder chamber 26. It will be seen that spring 54 is compressed as hydraulic fluid is transferred to the main cylinder chamber by operation of the pump in the manner just described.

FIG. 3 shows the piston rod in its fully retracted position. As noted, the internal diameter of chamber 28 is smaller than the internal diameter of chamber 26, which thereby establishes a stop shoulder 110 below which piston head 42 cannot descend. However, piston rod 36 can be positioned at any location between the extreme positions illustrated in FIGS. 2 and 3, as required to properly tension the chains which are attached to the opposite end of the load binder as described in FIG. 1.

Now referring to FIGS. 5, 6 and 7, it may be seen that there are three channel ports connecting the upper portion of main cylinder chamber 26 with the lower portion of reservoir chamber 28. These channels include channel 70, previously described, manual release channel 112 and overpressure relief channel 114.

Referring to FIG. 6, it will be seen that channel 112 is closed off at its lower end by needle valve 116. Needle valve 116 includes a threaded body portion 118 which is accommodated by the internal threads of a suitable opening which intersects channel 112 and permits the needle valve to be advance and retracted as desired. End 120 of the needle valve is conically tapered to operate within a portion of channel 112 leading to reservoir chamber 28. An external knob 122 provides a means by which the valve can be manually turned.

When the operator operates the pump to retract piston rod 36 to its fullest extent, there is a danger that the main cylinder chamber may be overpressured. This is prevented by the operation of release channel 114. Please note that valve ball 124 is located in the lower part of channel 114. Valve ball 124 is biased closed by a spring 126, both the ball valve and the spring being inserted through an opening which is closed off by bolt 128 in the same manner as for valve balls 64 and 72, previously described. Overpressurizing the upper or main chamber 26 via the action of the pump causes valve ball 124 to open and, thereby, to create a flow for the hydraulic fluid from the upper main cylinder chamber to the reservoir chamber.

Now referring again to FIGS. 2, 3 and 4, it will be seen that mechanical locking lugs 100 and 102 are rotated into their wedge locking positions when piston rod 36 is at its desirable position to apply the proper amount of tension to chains 18 and 22. These mechanical locks swivel or rotate about their respective axles against the extended rod. Hence, they hold the rod in place when the hydraulic fluid pressure is released by the opening of the needle valve 116, just described. Therefore, during the period of time that the load binders are employed during transport, the mechanical locks provide the means for maintaining the rod in its proper position, rather than the application of the hydraulic fluid. If desired, however, the needle valve does not have to be released so that the hydraulic fluid is still applied.

When the load is to be unloaded from truck bed 14, it is again required to repressurize the load binder as previously described. That is, needle valve 116 is rotated to its closed position and the pump is again operated to pressurize main cylinder chamber 26 so as to take the pressure off mechanical locks 100 and 102. When the pressure is released then these locks are rotated to permit piston rod 36 to be extended so as to relieve the tension on chains 18 and 22. Once the locks are released, then pressure is relieved from chamber 26 by opening the needle valve. The combined tension on the piston rod as applied by the chains which are attached thereto and the operation of internal spring 54 is enough to extend piston rod to the position shown in FIG. 2. At the same time, reservoir fluid is recycled to the reservoir chamber, again as shown in FIG. 2.

While a particular embodiment of the invention has been shown and described, it will be understood that the invention is not limited thereto, since modifications may be made that will become apparent to those skilled in the art. For example, top connection 20 can also be a swivel connection, if desired. Further, it should also be noted that the preferred hold down means to which the load binder described above is attached are chains 18 and 22. This means may also include straps, metal bands, and the like.

Finally, the description above pertains to a load binder in which the channels connecting the main cylinder chamber and the reservoir chamber to the pump chamber are included in the same housing. It may be desirable to include the pump mechanism in a separate housing with the channel or port connections made externally therebetween. Also, the main cylinder chamber and the reservoir chamber do not have to be in-line.

What is claimed is:

1. Load binding apparatus for tightening a binder between a first point on a load and a second point on a structure on which the load rests and to which the load is tied, comprising
   a cylinder housing having an external connecting end for attaching to the first point, said cylinder housing having an operating chamber and a reservoir chamber,
   a piston rod having a piston assembly operating in said operating chamber having an external connecting end for attaching to the second point, said piston assembly including
      a reservoir piston adjacent said reservoir chamber,
      an operating piston adjacent said operating chamber, and
      a biasing spring therebetween,
   a pump having a pump cylinder and a pump piston operating therein,
   a first fluid channel communicating said reservoir chamber with said pump cylinder chamber, said first fluid channel including a first check valve,
   a second fluid channel communicating said reservoir chamber with said operating chamber, said second fluid channel including a second check valve, such that fluid is widthdrawn from said reservoir chamber through said first channel and past said first check valve into said pump chamber with the movement of said pump piston away from said first check valve and is delivered from said pump chamber through said second channel past said second check valve into said operating chamber with the reverse movement of said pump piston to pumpingly transfer fluid from said reservoir chamber to said operating chamber to thereby lower the piston rod in the operating chamber to tightenly bind the load, the reverse movement of the pump piston also shutting said first check valve,
   said biasing spring allowing axial movement of said operating piston with respect to said reservoir piston.

2. Load binding apparatus in accordance with claim 1, and including
   a third fluid channel communicating said operating chamber with said reservoir chamber, said third fluid channel including a manually operated valve, said manually operated valve shutting said third channel during the pumping transfer of fluid from said reservoir chamber to said operating chamber, said manually operated valve being opened to relieve pressure in said operating chamber by allowing fluid flow in said third channel to said reservoir chamber.

3. Load binding apparatus in accordance with claim 2, wherein said manually operated valve is a needle valve.

4. Load binding apparatus in accordance with claim 1, wherein said operating chamber is coaxial with said reservoir chamber.

5. Load binding apparatus in accordance with claim 4, and including a reservoir piston operating against the moving surface of the liquid in said reservoir chamber, said reservoir piston moving with the fluid removal from said reservoir chamber.

6. Load binding apparatus in accordance with claim 5, and including
   a third fluid channel communicating said operating chamber with said reservoir chamber, said third fluid channel including a manually operated valve, said manually operated valve shutting said third channel during the pumping transfer of fluid from said reservoir chamber to said operating chamber, said manually operated valve being opened to relieve pressure in said operating chamber by allowing fluid flow in said third channel to said reservoir chamber.

7. Load binding apparatus in accordance with claim 6, wherein said manually operated valve is a needle valve.

8. Load binding apparatus in accordance with claim 6, and including an internal support within said reservoir chamber and spring means between said piston rod piston and said support to bias upward said piston rod piston to start its upward movement when pressure is relieved from said operating chamber.

9. Load binding apparatus in accordance with claim 6, and including
   a fourth fluid channel communicating said operating chamber with said reservoir chamber, said fourth fluid channel including a third check valve, said third check valve operating at a predetermined high pressure level in said operating chamber to cause pressure relief in said operating chamber and flow of fluid from said operating chamber to said reservoir chamber.

10. Load binding apparatus in accordance with claim 6, and including
    mechanical locking means for holding said piston rod in place when pressure is relieved from said operating chamber.

11. Load binding apparatus in accordance with claim 10, wherein said mechanical locking means includes a rotatable wedge lock that lockingly rotates against said piston rod, said wedge lock being releasable when said operating chamber is repressurized.

12. Load binding apparatus in accordance with claim 1, wherein said cylinder housing including said operating chamber and said reservoir chamber and the pump housing including said pump cylinder are included in a common structure and wherein said first channel and said second channel are ports through said common structure.

13. Load binding apparatus in accordance with claim 1, wherein at least one of said external connecting ends for attaching to the load includes a swivel connection.

14. Load binding apparatus in accordance with claim 1, wherein said pump piston includes an external operating end suitable for receiving a leveraging rod.

* * * * *